United States Patent Office 3,597,155
Patented Aug. 3, 1971

3,597,155
CRYSTALLINE MM AND PROCESS FOR
MANUFACTURE THEREOF
Edith M. Flanigen, Buffalo, N.Y., assignor to Union
Carbide Corporation, New York, N.Y.
No Drawing. Continuation of application Ser. No.
218,141, Aug. 20, 1962, which is a continuation-in-
part of application Ser. No. 607,136, Jan. 3, 1967.
This application Feb. 14, 1969, Ser. No. 799,485
Int. Cl. C01b 33/28
U.S. Cl. 23—111                        4 Claims

ABSTRACT OF THE DISCLOSURE

A crystalline zeolite having the mordenite crystal structure is treated with an aqueous mineral acid solution to increase the molar $SiO_2/Al_2O_3$ ratio and the apparent pore diameter while retaining the characteristic crystal structure of the starting material. The product is referred to as "crystalline MM."

RELATED APPLICATIONS

This application is a continuation-in-part of application Ser. No. 607,136 filed Jan. 3, 1967, which is in turn a continuation of application Ser. No. 218,141 filed Aug. 20, 1962, both applications being now abandoned.

The present invention relates to novel three-dimensional crystalline material and process for production thereof. More particularly, the present invention relates to a novel crystalline material which possesses the ability to selectively adsorb a wide variety of sorbates without substantial change in its characteristically thermal and chemically stable crystal structure.

Mordenite is a crystalline zeolitic aluminosilicate which occurs in nature, such as in Morden, Nova Scotia, and also has been synthesized by a number of workers. Natural mordenite has the formula:

$$M_{2/n}O:Al_2O_3:ySiO_2:zH_2O$$

wherein M is made up of one or more exchangeable metal cations, usually Ca, Na and K; $n$ is the valence of M; $y$ is usually between 9 and 10, but may be lower in less pure specimens; and $z$ is usually between 6 and 7.

R. M. Barrer, [J. Chem. Soc., 2158 (1948)] reported the synthesis of mordenite from aqueous sodium aluminosilicate gels where best results were obtained in the temperature range 265–295° C. at a pH after crystallization of between 8 and 10. Synthesis of mordenite has also been reported by D. W. Breck et al. in J.A.C.S., 78, 2338 (1956), and L. L. Ames et al. in Amer. Mineralogist, 43, 476 (1958)

Barrer also reported in Trans. Farad. Soc., 40, 555, (1944) that natural mordenite occluded ethane but could not occlude n-paraffins, iso-paraffins or aromatic hydrocarbons. Barrer subsequently reported [Nature, 164, 112–113 (1949)] the preparation of a crystalline hydrogen form of mordenite by heating ammonium-exchanged mordenite with oxygen at 350° C.; although natural mordenite excluded propane, the hydrogen form occluded propane, although slowly. According to Barrer, the change in molecular sieve behavior was achieved by "oxidizing away part of the interstitial substance of the crystal."

Heretofore, the alternation or modification of sorption properties in crystalline zeolites, natural as well as synthetic, has been achieved in the art of conventional base-exchange of one exchangeable cation for another, by prior partial sorption of certain polar sorbates, or by the oxidative high-temperature treatment of ammonium zeolites as described hereinabove by Barrer. Treatment of most crystalline zeolites such as chabazite, analcite, etc. with acids does not result wholly in ion exchange between zeolitic cations and hydrogen, but instead causes a substantial degradation of crystal structure and subsequent loss of molecular sieve properties.

It is an object of the present invention to provide novel three-dimensional crystalline materials having a characteristic crystal structure as derived from X-ray powder diffraction patterns and exceptional crystal and chemical stability in acidic atmospheres and under thermal stress, and being characterized by the ability to adsorb and desorb large amounts of fluid molecules having critical dimensions greatly in excess of about 4 A. units.

It is a further object of the present invention to provide a process for controllably modifying the adsorption and desorption characteristics of synthetic or natural mordenite without affecting the characteristic crystal structure thereof as judged by X-ray powder diffraction patterns and without detracting from the characteristic crystal and chemical stability of the starting material in acidic atmospheres and under thermal stress.

The novel compositions of the present invention are three-dimensional crystalline materials whose chemical composition is expressed in terms of moles of oxides as:

$$(1-x)[M_{2/n}O+A_2O]:Al_2O_3:ySiO_2$$

wherein said material contains from zero to 20 weight-percent water, and wherein A is at least one ion selected from the group consisting of $H^+$ and $H_3O^+$, M is at least one alkali or alkaline earth metal cation, $n$ is the valence of M, $x$ has a value of from zero to 0.22, $y$ has a value of from 9.0 to about 25 with the proviso that when $y$ has a value between 9.0 and 10.5 the cation represented by M constitutes less than 50 equivalent percent of the cations associated with the $AlO_4$ tetrahedra, the atoms in said crystalline material are arranged in such a manner that the X-ray powder diffraction pattern of said crystalline material is essentially the same as that shown in the following Table I.

TABLE I d, A.

13.5±0.3
9.0±0.1
6.57±0.05
5.78±0.05
4.51±0.05
3.98±0.05
3.47±0.05
3.39±0.05
3.21±0.05
2.89±0.05

Stated in other terms, if only the metal cations of the composition are considered, in the molar formula $$(1-x')M_{2/n}O:Al_2O_3:ySiO_2$$

$x'$ has a value of more than 0.5 when $y$ has a value between 9.0 and 10.5 in accordance with the proviso of the above definition.

Preferably the hydrated crystalline MM material is designated in relation to chemical composition expressed in terms of moles of oxides as follows:

$$[qA_2O+(1-q)M_{2/n}O]:Al_2O_3:ySiO_2$$

wherein $n$ is the valence of M, M is at least one metal selected from the group consisting of alkali metal and alkaline earth metal, $q$ ranges from 1 to 0.1, $y$ ranges from 9.0 to 25, wherein $q$ is greater than 0.5 when $y$ is between 9.0 and 10.5, wherein the material contains up to about 20 weight-percent water, wherein A is hydrogen ion $H^+$ and/or hydronium ion $H_3O^+$ and wherein the atoms in the material are arranged in such a manner that the X-ray powder diffraction pattern of the crystalline MM material is essentially the same as that shown in Table I.

The present invention also includes a process for producing the three-dimensional crystalline product material specified immediately above, said process comprising contacting with an aqueous mineral acid solution a three-dimensional crystalline aluminosilicate, i.e., a natural or synthetic mordenite, having a chemical composition expressed in terms of moles of oxides as

$$(1-x)M_{2/n}:Al_2O_3:ySiO_2:zH_2O$$

wherein M is a metal cation, $n$ is a valence of M, $x$ has a value of from zero to 0.22, $y$ has a value of from about 6 to about 11, $z$ has a value of from zero to about 7, the atoms of said crystalline aluminosilicate being arranged in such a manner that the X-ray powder diffraction pattern thereof is essentially the same as that shown in Table I, said contact between said mineral acid and said crystalline aluminosilicate being sufficient to increase the molar $SiO_2/Al_2O_3$ ratio, increase the apparent pore size, and retain the characteristic crystal structure of the starting aluminosilicate. At least 0.1 mole of M per mole of alumina will be extracted by this procedure.

The three-dimensional crystalline material of the present invention is not a zeolite in the strictest technical connotation of the term because all true zeolites contain M ions, in the ratio of approximately one $M_{2/n}$ per alumina, said M ions being reversibly exchangeable with other materials in ionic form such as ammonium, metals of Groups I and II of the Periodic Table and the transition metals of the Periodic Table. In sharp contrast, the crystallnie products of the persent invention, while they may be capable of exchanging any residual M ions present in their structure after acid treatment with replacement ions such as ammonium, metals of Groups I and II of the Periodic Table and the transition metals of the Periodic Table, they are not capable of reversibly exchanging the hydrogen or hydronium ions which are believed to reside after acid treatment at the site formerly occupied by M before the acid treatment. Consequently, to avoid any technical ambiguity, the products of the present invention will be hereinafter referred to as "crystalline MM."

Crystalline MM contains a major amount of silica, and varying amounts of alumina and consists of a three-dimensional framework of $SiO_4$ and $AlO_4$ tetrahedra. The tetrahedra are cross-linked in covalent bondage by sharing the electrons of oxygen atoms so that the ratio of oxygen atoms to the total of silicon and aluminum atoms is two, i.e., $O/(Si+Al)=2$. The tetrahedra network may also contain cations such as the alkali or alkaline earth metal cations which balance the electrovalence of some or all of the alumina tetrahedra. The space between the tetrahedra in the crystal may also be filled with water in its hydrated state. It should further be noted that crystalline MM includes structures deficient in alumina tetrahedra and in exchangeable metal cations, and in some instances substantially void of exchangeable metal cations.

The hydrated form of crystalline MM can be activated by heating to cause loss of the water contained in the spaces between the tetrahedra. The hydration-dehydration process is reversible and does not substantially change the X-ray powder diffraction pattern. Dehydration, either partial or complete, results in a crystalline structure interlaced with channels, some of which are interconnecting, and all of which are of molecular dimensions. The channels within the interstices of crystalline MM offer high surface areas for the adsorption of foreign molecules and may in some instances provide catalytic effects on various chemical reactions. The size of these channels is conveniently expressed in terms of "apparent pore size."

The phrase "apparent pore size" as used herein may be defined as the maximum critical dimension of the molecular species which is adsorbed by the adsorbent under normal conditions. The critical dimension is defined as the diameter of the smallest cylinder which will accommodate a model of the molecule constructed using the best available values of bond distances, bond angles and Van der Waasl' radii. The apparent pore size will always be larger than the structural or effective pore diameter, which may be defined as the free diameter of the appropriate silicate ring in the structure of the adsorbent.

A unique feature of crystalline MM is that its apparent pore size can be varied by controlling process conditions, while maintaining its characteristic crystal structure and X-ray powder diffraction pattern. That is, the apparent pore size of crystalline MM of the same aforementioned crystal structure as characterized by the X-ray powder diffraction pattern of Table I, may be varied as desired from preparation to preparation from greater than 4 A. units to as high as about 9 A. units. Furthermore, the variance in apparent pore size is not due to any great extent to ion exchanging the M ion of the crystal structure as is commonly done with classical zeolitic materials, but rather the variance in apparent pore size in largely due to the changing amount of $Al_2O_3$ or the $SiO_2/Al_2O_3$ ratio in the various species falling within the generic crystalline MM material characterized above and in addition to the removal of some or all of the M ion by the acid treatment.

The activated crystalline MM product, unlike the common adsorbents such as silica gels and charcoals, exhibits a selectivity based on the size and shape of the adsorbate molecule. Among those adsorbent molecules whose size and shape are such as to permit adsorption by the activated adsorbent product, a very strong preference is exhibited toward those that are polar, polarizable, and unsaturated. The novel adsorbent is capable of adsorbing large quantities of adsorbate at either very low pressures, at very low partial pressures, or at very low concentrations. One or a combination of these adsorption characteristics can make the adsorbent of the invention useful in numerous gas or liquid separation processes, particularly where feed streams having acid components must be dried or purified, such use requiring an acid-stable adsorbent. Exemplary of these uses are the drying of halogen and halogen compound-containing feed streams, and the sweetening of natural gas streams by removal of sulfur compounds therefrom. In such adsorptive applications, the novel adsorbent composition, with its demonstrated acid stability and characteristic high thermal stability, is well suited.

The unusual thermal stability of crystalline MM was demonstrated by heating this composition in air at temperatures as high as 900° C. for 48 hours, at the end of which time, no substantial change in the X-ray powder diffraction pattern was observed.

The crystalline MM composition of the invention may, among other ways, be characterized and distinguished from other substances by its X-ray powder diffraction pattern, its chemical composition and its adsorptive behavior. The X-ray powder diffraction patterns identifying the product of the invention were obtained by employing standard techniques. The radiation was the K-alpha doublet of copper, and a Geiger counter spectrometer with a strip-chart pen recorder was used. The peak heights, I, and the positions of the lines as a function of $2\theta$, where $\theta$ is the Bragg angle, were read from the spectrometer chart. From these, the relative intensities $$100I/I_0$$

where $I_0$ is the intensity of the strongest line or peak, and $d$ (obs.) the interplanar spacing in agnstroms corresponding to the recorded lines, were calculated.

Examination of the X-ray diffraction patterns of various samples of the composition of the invention shows that these patterns have substantially all the same lines. The spatial arrangement of the tetrahedra in the structure is essentially identical in all the various forms of the product. The appearance of a few minor lines and the disappearance of others from one sample to another as well as slight changes in the intensities and positions of some of the X-ray lines can be attributed to the different $SiO_2/Al_2O_3$ molar ratios, the different sizes of cations and numbers of cations present in the various forms, since these differences contribute to some small expansion or contraction of the crystals. Also, when the product composition is activated or dehydrated for use as an adsorbent at temperatures of between 100° and 600° C. in the presence of water vapor or other gases or vapors, the relative intensities of the lines in the X-ray powder diffraction pattern may be appreciably changed from those existing in the patterns of the unactivated composition. Small changes in line positions may also occur under these conditions. These changes in no way hinder the identification of these X-ray patterns as belonging to the product composition of the invention.

The particular X-ray technique and/or apparatus employed, the humidity, the temperature, the orientation of the powder crystals and other variables, all of which are well known and understood to those skilled in the art of X-ray crystallography or diffraction can cause some variations in the intensities and positions of the lines. These changes, even in those few instances where they become large, pose no problem to the skilled X-ray crystallographer in establishing identities. Thus, the X-ray data given herein to identify the product structure are not to exclude those materials which, due to some variable mentioned or otherwise known to those skilled in the art, fail to show all of the lines, or show a few extra ones permissible in the structure of the product, or show a slight shift in position of the lines, so as to give a slightly larger or smaller lattice parameter.

Thus, the crystalline MM composition of the invention has an X-ray powder diffraction pattern characterized by at least those reflections set forth in Table I, and typical examples have essentially the same X-ray powder diffraction pattern as that shown in Table II.

TABLE II

| $d$, A. | $100 \times I/I_0$ | $d$, A. | $100 \times I/I_0$ |
|---|---|---|---|
| 13.52 | 42 | 3.198 | 35 |
| 10.19 | 7 | 2.939 | 3 |
| 9.025 | 100 | 2.891 | 11 |
| 6.771 | 4 | 2.710 | 2 |
| 6.574 | 8 | 2.697 | 33 |
| 6.376 | 37 | 2.556 | 18 |
| 6.059 | 3 | 2.519 | 4 |
| 5.778 | 28 | 2.460 | 4 |
| 4.513 | 42 | 2.227 | 2 |
| 4.258 | 6 | 2.130 | 3 |
| 4.133 | 9 | 2.124 | 2 |
| 3.980 | 100 | 2.045 | 11 |
| 3.830 | 5 | 2.041 | 5 |
| 3.757 | 8 | 1.952 | 5 |
| 3.563 | 14 | 1.876 | 4 |
| 3.528 | 3 | 1.808 | 11 |
| 3.471 | 24 | 1.795 | 3 |
| 3.410 | 23 | 1.695 | 3 |
| 3.386 | 44 | 1.691 | 2 |
| 3.218 | 24 | 1.664 | 3 |

The process of the present invention comprises, as noted hereinabove, acid treating the starting crystalline material with an aqueous mineral acid. By the term "mineral acid" is meant inorganic acids, per se, including hydrochloric acid, hydrofluoric acid, and sulfuric acid.

The acid treatment may be conducted at either elevated or room temperature. In general, an increase in temperature for a given concentration of acid results in a product having a lower $M_{2/n}O/Al_2O_3$ ratio and a high $SiO_2/Al_2O_3$ ratio in a given time. In general, treatment temperatures ranging from about room temperature to about 100° C. are amenable for use in the process.

The concentration of acid may range up to the most concentrated forms. In general, concentrations of about 4 normal to about 10 normal are used. Increasing concentration of the acid results in decreased time required to increase the $SiO_2/Al_2O_3$ ratio and decrease the $M_{2/n}O/Al_2O_3$ ratio at a given temperature.

The acid treatment of the present invention is a convenient and efficient method of controllably tailoring the particular crystalline MM products of the present invention. During acid treatment a portion of the $M_{2/n}$ component of the starting material is removed from the starting crystalline structure. After the $M_{2/n}$ component is leached from the structure and while the structure is in the hydrated form, the vacant $M_{2/n}$ site is probably occupied by a hydrogen ion or a hydronium ion, but the exact location of the hydrogen or hydronium ion is a matter concerning the fine structure of the crystal and precise knowledge thereof is not essential to utilization of these novel materials. It is significant, however, to note as mentioned above that this hydrogen ion is not capable of undergoing further ion exchange reactions by the normal ion exchange techniques generally used with the classical zeolites; that is, exposure of the acid treated crystalline MM to aqueous salt solutions such as $CaCl_2$ will not result in Ca replacement of the $H^+$ ion. While this is true, the residual $M_{2/n}$ components may still be ion-exchanged by the normal ion-exchange techniques used with the classical zeolites; namely, treatment, singly or consecutively, of the material with aqueous salt solutions at temperatures in the range of about 20° C. to 100° C.

To illustrate this characteristic behavior of the present crystalline MM materials, the following data are presented concerning a starting crystalline material having the following chemical composition as moles of oxides, before acid treatment:

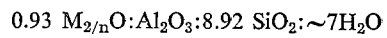

The $CaO/Al_2O_3$ ratio of the starting material was 0.36; the $Na_2O/Al_2O_3$ ratio of the material was 0.47; the $K_2O/Al_2O_3$ ratio of the material was 0.04; the $MgO/Al_2O_3$ ratio of the material was $<0.07$. This starting crystalline material was acid-treated with 2 normal HCl for about 1 hour at 20° C. in four consecutive treatments using fresh HCl solution for each treatment, to produce a crystalline MM product material of the following composition:

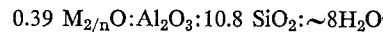

wherein the MgO was essentially all removed, the molar $CaO/Al_2O_3$ ratio of the product was 0.36, the $Na_2O/Al_2O_3$ ratio of the product was 0.02 and the $K_2O/Al_2O_3$ ratio of the product was 0.01. It should be noted that the $Na_2O$, $K_2O$ and MgO components were virtually completely removed from the $M_{2/n}$ sites in the product material, and the void $M_{2/n}$ sites were considered to be occupied by $H^+$ or $H_3O^+$ ions. The crystalline MM material was then contacted in the hydrated form with a 2 normal solution of $CaCl_2$ at room temperature several consecutive times. There was no change in the $CaO/Al_2O_3$ ratio in the crystalline MM material, thereby indicating that the $H^+$ and/or $H_3O^+$ ions considered to be occupying the vacant $M_{2/n}$ sites could not be ion-exchanged by normal techniques employed with classical zeolites. In all probability and in accordance with standard technical evidence the occupant of the vacant $M_{2/n}$ site is probably a hydronium ion when the crystalline MM is hydrated.

Dehydration is accomplished by heating the hydrated crystalline MM to a temperature ranging from about 100° C. up to about 800° C., preferably at 350–400° C. The dehydration is preferably performed in a flowing air or inert gas atmosphere or at reduced pressure. Dehydration may also be termed "activation" as the term is used in classical zeolitic dehydration, because analogous to activation of classical zeolites, dehydration of crystalline MM frees the interstitial channels of water and permits selective adsorption of various fluid molecular species into the interstices of the tetrahedra framework of the MM crystals.

As is evident, although the chemical formulas for the various crystalline MM products may vary, the X-ray diffraction pattern in all the species of MM is substantially the same and essentially the same as that shown in Table I.

The acid leaching process of the present invention is ideally suited for producing the widely variant $M_{2/n}/Al_2O_3$ and $SiO_2/Al_2O_3$ molar ratios of the present invention. By way of illustration, the following Table III contains a compilation of the various products all within the generic crystalline MM composition which are illustrative of the present products and the flexible acid treating process for the production thereof.

stantial portion of exchangeable cation M and have a $SiO_2/Al_2O_3$ ratio below 9; appreciable amounts of oxygen and a lesser amount of nitrogen are adsorbed, but no more than about 0.5 wt. percent of n-butane and iso-butane. Considering products 3 to 8, as the cation content in the treated materials is gradually decreased and as the $SiO_2/Al_2O_3$ ratio is increased beyond 9, there is increased capacity for oxygen, nitrogen, n-butane and

TABLE III

| Number | Starting material, mole ratios | | | Treatment | | | Product, mole ratios | | |
|---|---|---|---|---|---|---|---|---|---|
| | $H_2O/Al_2O_3$ | $SiO_2/Al_2O_3$ | $M_{2/n}O/Al_2O_3$ | HCl (normality) | Temp. (°C.) | Time (hrs.) | $H_2O/Al_2O_3$ | $SiO_2/Al_2O_3$ | $M_{2/n}O/Al_2O_3$ |
| 1 | 7.0 | 8.9 | 0.88 | 12 | 100 | 1 | 8.4 | 14.8 | 0.53 |
| 2 | 7.0 | 8.9 | 0.88 | 12 | ~20 | 504 | 8.3 | 13.9 | 0.47 |
| 3 | 3.6 | 9.9 | 0.97 | 6 | ~20 | 16 | 4.5 | 10.0 | 0.61 |
| 4 | 3.6 | 9.9 | 0.97 | 12 | ~209 | 16 | 4.5 | 9.8 | 0.65 |
| 5 | 4.9 | 8.8 | 1.03 | 6 | ~20 | (¹) | 4.9 | 9.1 | 0.39 |
| 6 | 4.9 | 8.8 | 1.03 | 6 | (²) | 20 | 4.1 | 9.7 | 0.31 |
| 7 | 5.1 | 10.6 | 1.01 | 4.7 | 100 | 1 | 7.3 | 12.7 | 0.46 |
| 8 | 5.1 | 10.6 | 1.01 | ³ 4.7 | 100 | 1 | 6.2 | 10.5 | 0.37 |
| 9 | 5.3 | 9.43 | 0.78 | (⁴) | 100 | 3.5 | 13.8 | 24.7 | 0.71 |
| 10 | 5.3 | 9.43 | 0.78 | 12 | 100 | 12 | 10.7 | 15.7 | 0.38 |
| 11 | 5.3 | 9.43 | 0.78 | (⁵) | 60 | 5 | 8.9 | 12.9 | 0.71 |

¹ Starting material treated 4 times at concentratiom and temperature shown for one-half hour intervals and thereafter at concentration and temperature shown but for 4 hours therefore totally 6 hours.
² Starting material treated for one hour at 100° C. at specified acid concentration and thereafter for 16 hours at room temperature for a total of 70 hours.
³ Hydrofluoric acid used instead of HCl.
⁴ Starting material treated with 5 normal hydrofluoric acid for 1 hour and thereafter with 1 normal hydrochloric acid ten times for fifteen minutes per time.
⁵ Mixture of hydrofluoric and hydrochloric acid with solution being 0.2 normal in HF and 1.0 normal in hydrochloric acid.

The data in Table III are self-explanatory. It will suffice to call attention to number 4 wherein the $M_{2/n}O$ content was selectively reduced from a $M_{2/n}O/Al_2O_3$ molar ratio of 0.97 in the starting material to about 0.65 without appreciably altering the $SiO_2/Al_2O_3$ ratio, while in run number 9 the $SiO_2/Al_2O_3$ was drastically increased from about 9.43 to 24.7 while the $M_{2/n}O/Al_2O_3$ ratio was only slightly changed. From the data presented in Table III it is readily apparent that the present novel process is ideally suited for controllably tailoring the $M_{2/n}O/Al_2O_3$ and $SiO_2/Al_2O_3$ molar ratios to meet the needs of a particular application such as selective adsorption. This significance of the varying $SiO_2/Al_2O_3$ and $M_{2/n}O/Al_2O_3$ ratios of crystalline MM are clearly shown by the data in Table IV as presented and discussed hereinafter.

The representative data of Table IV are presented to demonstrate the effect of degree of cation $M_{2/n}O/Al_2O_3$ removal and $SiO_2/Al_2O_3$ ratio on the adsorptive character of the several adsorbents with respect to various sorbate molecules covering a range of critical dimensions. Adsorbents 1 and 2 are mordenites which contain a subisobutane molecules covering a range of critical dimensions from 2.8 A. through 5.6 A. Crystalline MM product numbered 9, with about half its cations removed and its $SiO_2/Al_2O_3$ increased to 12.7 by the acid treatment process of the invention, is of special interest in that it adsorbed 2.6 wt. percent isobutane. Products 10 through 14, characterized by substantial cation removal and/or increased $SiO_2/Al_2O_3$, demonstrate the continued upward trend in apparent pore size, such that not only appreciable amounts of n-butane and isobutane, but also neopentane (7.0 A.) and $C_8F_{16}O$ (7.5 A.), are adsorbed. Adsorbent MM composition numbered 14, having a $SiO_2/Al_2O_3$ of 24.7 has an apparent pore size large enough to sorb 5.6 wt. percent of $C_8F_{16}O$, thus showing that adsorbent MM compositions having apparent pore sizes ranging through at least about 8 A. and up to nearly 9 A. can be produced by the method of the invention. The fact that $$(C_4H_9)_3N (9.1 \text{ A.})$$

was not adsorbed shows that crystalline MM exhibits molecular sieve characteristics.

TABLE IV

| Number | Product composition, mol ratios | | Gms. adsorbed/100 gms. og activated Material | | | | | | |
|---|---|---|---|---|---|---|---|---|---|
| | $M_{2/n}O/Al_2O_3$ | $SiO_2/Al_2O_3$ | $O_2$, −183° C., 700 mm.¹ | $N_2$, −196 °C., 700 mm.² | N-butane, 25° C., 700 mm.³ | Iso-butane, 25° C., 700 mm.⁴ | Neopentane, 25° C., 700 mm.⁵ | $C_8F_{16}O$, 25° C., 20 mm.⁶ | $(C_4H_9)_3N$, 50° C., 0.7 mm.⁷ |
| 1 | 1.03 | 8.8 | 8.3 | 1.5 | 0.6 | 0.4 | | | |
| 2 | .88 | 8.9 | 14.0 | 1.0 | 0.0 | 0.0 | 0.0 | | |
| 3 | 1.02 | 10.5 | 15.3 | 0.0 | 0.0 | | | | |
| 4 | 1.01 | 10.6 | 14.3 | 5.3 | 0.6 | 0.3 | 0.3 | 0.5 | |
| 5 | 0.50 | 10.5 | 16.1 | 5.0 | 0.0 | | | | |
| 6 | 0.39 | 9.1 | 10.4 | | 1.4 | 0.1 | | | |
| 7 | 0.31 | 9.7 | 10.9 | | 1.6 | <1.0 | | | |
| 8 | 0.37 | 10.5 | 15.0 | 12.2 | 4.1 | 0.5 | | | |
| 9 | 0.46 | 12.7 | 13.3 | 10.7 | 3.7 | 2.6 | | | |
| 10 | 0.71 | 12.9 | 14.8 | | 3.8 | 1.8 | | 2.4 | ⁸ 0.9 |
| 11 | 0.47 | 13.9 | 24.4 | 18.1 | 4.6 | 2.3 | 4.2 | | |
| 12 | 0.53 | 14.8 | 22.8 | 17.2 | 4.8 | 2.7 | 4.4 | | |
| 13 | 0.38 | 15.7 | 15.9 | | 4.4 | 3.0 | | 3.8 | ⁸ 1.5 |
| 14 | 0.71 | 24.7 | 14.2 | | 3.9 | 3.1 | | 5.6 | ⁸ 1.8 |

¹ Critical dim.=2.8 A.
² Critical dim.=3.0 A.
³ Critical dim.=4.9 A.
⁴ Critical dim.=5.6 A.
⁵ Critical dim.=7.0 A.
⁶ Critical dim.=7.5 A.
⁷ Critical dim.=9.1 A.
⁸ Probably at least some liquid condensation on external surface of crystal particle because of low $P_0$ at sorption temperature.

Further illustrative of the present invention are the following Examples A, B, C, D and E.

EXAMPLE A

Two grams of a natural sodium-potassium-calcium mordenite analyzing $0.88M_{2/n}O:Al_2O_3:8.9SiO_2:7H_2O$ were treated with a 12 N HCl solution for 504 hours at room temperature. After filtration and washing several times with distilled water, the product analyzed $$0.47M_{2/n}O:Al_2O_3:13.9SiO_2:8.3H_2O$$

EXAMPLE B

Nine grams of a natural sodium-calcium-potassium mordenite analyzing $0.78M_{2/n}O:Al_2O_3:9.43SiO_2:5.3H_2O$ were treated at 100° C. with 5 N HF for one hour, followed by ten separate treatments with 1 N HCl at 100° C. at 15 minutes per treatment. A sample of the filtered, washed product analyzed $$0.71M_{2/n}O:Al_2O_3:24.7SiO_2:13.8H_2O$$

EXAMPLE C

Ten grams of a synthetic sodium mordenite analyzing $1.01M_{2/n}O:Al_2O_3:10.6SiO_2:5.1H_2O$ were treated with 4.7 N hydrofluoric acid solution for one hour at 100° C. A sample of the filtered, washed product analyzed 0.46

$$0.46M_{2/n}O:Al_2O_3:12.7SiO_2:7.3H_2O$$

EXAMPLE D

The utility of activated crystalline MM as a desiccant is shown by the following data: a crystalline MM material activated at 380° C. under reduced pressure was exposed to water vapor. The equilibrium water adsorption value at room temperature and 4 mm. Hg pressure was found to be 10.7 wt. percent. This MM adhorbent had a molar $SiO_2/Al_2O_3$ ratio of 12.7 and a molar $M_{2/n}O/Al_2O_3$ ratio of 0.46.

EXAMPLE E

In separate runs, isobutylene (5.6 A.) and propylene (5.0 A.) were contacted with activated (at 350° C.) crystalline MM having a $SiO_2/Al_2O_3$ ratio of 9.1 and 0.39 moles of $Na_2O$ (total cation content) per mole of $Al_2O_3$. In the case of propylene, reaction temperatures of 100° C. and room temperatures were used; with isobutylene, room temperature was used. Polymerization of the propylene was indicated by the fact that the amount of propylene sorbed by the MM adsorbent was less than that adsorbed by sodium cation rich adsorbent of the same crystal structure, indicating plugging of the pores; also, upon subsequent reactivation, carbonization was observed. With isobutylene, polymerization was so extensive that liquid formed in the vessel containing the MM adsorbent. This liquid was subsequently identified by infrared analysis as polymerized isobutylene. Isobutylene when contacted with a sodium rich form of the same crystal structure was only slightly adsorbed and yielded no polymeric liquid products. The free radical type of catalytic activity which was unexpectedly found in this adsorbent may be applied under a large variety of conditions to alter the molecular weight of hydrocarbon fluids. For instance, since the crystal structure is exceedingly stable under strongly acidic conditions, known Lewis Acid catalysts may be used in combination with the new adsorbent for liquid phase alkylation processes.

Although preferred embodiments have been described in detail, it is contemplated that modifications of the composition and process may be made and that some features may be employed without others, all within the spirit and scope of the invention as set forth herein.

What is claimed is:

1. Process for increasing the pore size of a crystalline zeolite having the mordenite crystal structure which comprises contacting with an aqueous mineral acid solution a three-dimensional crystalline aluminosilicate having an apparent pore diameter less than 4.9 angstroms and a chemical composition expressed in terms of moles of oxides as:

$$(1-x)M_{\frac{2}{n}}O:Al_2O_3:ySiO_2:zH_2O$$

wherein M is a metal cation, n is the valence of M, x has a value of from zero to 0.22, y has a value of from about 6 to 11, z has a value of from zero to about 7, the atoms of said crystalline aluminosilicate being arranged in such a manner that the X-ray powder diffraction pattern thereof is essentially the same as that shown in Table I, said contact between said mineral acid and said crystalline aluminosilicate being sufficient to increase the molar $SiO_2/Al_2O_3$ ratio, retain the characteristic crystal structure of the starting alumino-silicate, and increase the apparent pore diameter to the range of greater than 4.9 to about 9 angstroms.

2. Process according to claim 1 wherein the starting mordenite is contacted with an aqueous mineral acid solution having a concentration of from about 4 to about 12 normal and at a temperature of from about 20° C. to about 100° C.

3. Process according to claim 2 wherein the mineral acid is at least one selected from the group consisting of HCl and HF.

4. A zeolite having the mordenite crystal structure, a silica-to-alumina molar ratio of at least 10.5, an apparent pore diameter of greater than 4.9 angstroms, a molar $$\frac{M_2O/Al_2O_3}{n}$$

ratio of at least 0.37, M being a metal cation associated with the $AlO_4$ tetrahedra of said zeolite and n being the valence of M, said zeolite being prepared by the process of claim 1.

References Cited

UNITED STATES PATENTS

| | | | |
|---|---|---|---|
| 2,253,285 | 8/1941 | Connolly | 252—455 |
| 2,882,244 | 4/1959 | Milton | 23—113 |
| 3,008,803 | 11/1961 | Milton | 23—113 |
| 3,130,006 | 4/1964 | Rabo et al. | 23—111X |
| 3,140,252 | 7/1964 | Frilette et al. | 252—455X |
| 3,436,174 | 4/1969 | Sand | 23—113 |

OTHER REFERENCES

Barrer "J. Chem. Soc.," 1948, pages 2158–2163.

EDWARD J. MEROS, Primary Examiner

U.S. Cl. X.R.

23—112; 252—455